(12) United States Patent
Beutler et al.

(10) Patent No.: US 7,693,616 B2
(45) Date of Patent: Apr. 6, 2010

(54) SYSTEM AND METHOD OF REDUNDANCY MANAGEMENT FOR FAULT EFFECT MITIGATION

(75) Inventors: Arthur D. Beutler, Phoenix, AZ (US); Larry J. Yount, Scottsdale, AZ (US); Karen Brack, La Jolla, CA (US)

(73) Assignee: Honeywell International Inc., Morristown, NJ (US)

( * ) Notice: Subject to any disclaimer, the term of this patent is extended or adjusted under 35 U.S.C. 154(b) by 1041 days.

(21) Appl. No.: 11/394,415

(22) Filed: Mar. 31, 2006

(65) Prior Publication Data

US 2007/0233330 A1 Oct. 4, 2007

(51) Int. Cl.
*G01C 23/00* (2006.01)
(52) U.S. Cl. .............................. 701/3; 701/33; 701/36
(58) Field of Classification Search ............. 701/3, 701/4, 13, 14, 15, 33, 36; 244/175
See application file for complete search history.

(56) References Cited

U.S. PATENT DOCUMENTS

| | | | |
|---|---|---|---|
| 4,887,214 A * | 12/1989 | Takats et al. ............... | 701/3 |
| 5,670,856 A * | 9/1997 | Le et al. .................... | 318/564 |
| 5,806,805 A * | 9/1998 | Elbert et al. ............... | 244/195 |
| 6,446,911 B1 | 9/2002 | Yount et al. | |
| 7,209,809 B2 | 4/2007 | Yeh | |
| 2007/0109745 A1 | 5/2007 | Yeh | |

FOREIGN PATENT DOCUMENTS

| | | |
|---|---|---|
| EP | 1310848 | 5/2003 |
| WO | 0067080 | 11/2000 |

OTHER PUBLICATIONS

European Application No. 07106182.4—European Search Report mailed Oct. 29, 2007.

* cited by examiner

*Primary Examiner*—Gertrude Arthur Jeanglaud
(74) *Attorney, Agent, or Firm*—Ingrassia Fisher & Lorenz, P.C.

(57) ABSTRACT

Methods and systems are provided for redundancy management of a fly-by-wire avionics system. A control module for producing a control signal is provided comprising a common processing partition for receiving a flight input signal and at least one first mode input signal, a first processing partition coupled to the common processing partition and configured to receive the first mode input signals and flight input signal from the common processing partition, and a second processing partition coupled to the common processing partition. The first processing partition produces a first mode output signal in response to one of the first mode input signals and flight input signal. The second processing partition generates a second mode signal in response to the flight input signal when the first processing partition fails. The common processing partition produces the control signal in response to one of the first mode output signal and second mode signal.

20 Claims, 4 Drawing Sheets

SYSTEM AND METHOD OF REDUNDANCY MANAGEMENT FOR FAULT EFFECT MITIGATION

FIELD OF THE INVENTION

The present invention generally relates to electronic control systems, and more particularly relates to systems and methods for redundancy management in electronic control systems such as Fly-By-Wire (FBW) avionics systems.

BACKGROUND OF THE INVENTION

Modern aircraft are increasingly equipped with fly-by-wire (FBW) systems that replace many mechanical flight control systems. Complex mechanical assemblies were commonly incorporated in older aircraft to transmit pilot inputs/commands to various flight control surfaces, e.g., the rudder, elevator, and ailerons, of the aircraft. FBW systems were designed to convert the pilot inputs/commands into electrical signals (e.g., via transducers) that when combined with other data control the flight control surfaces. For example, electronic sensors are attached to the pilot's controls. These sensors transmit electronic data to actuator control modules (ACEs), as an intermediate destination, and this sensor data is then sent to various flight control modules (FCMs). The FCMs combine this sensor data with other sensors that monitor the state of the aircraft in flight (e.g., inertial sensors and air-data sensors) and transmit computed commands back to the various ACEs. The ACEs receive the computed commands from the FCMs and generate output commands that move hydraulic actuators based on the received computed commands. Each hydraulic actuator is coupled to a moveable surface such that movement of the actuator moves the primary control surface.

FBW systems typically employ a digital processor that accepts control inputs from the cockpit controls, combines this with aircraft state information from other sensors (e.g., inertial and air-data sensors), and translates the control inputs into digital control signals for actuator controller units (i.e., ACEs). The output commands from the actuator controller units produce signals to physically move flight control surfaces. The actuator controller units may also obtain feedback data by monitoring various output parameters indicative of the operation and position of the flight control surfaces. In one example, the FBW system uses three computers, each with three or two computing lanes, to achieve a three-way or a two-way redundancy comparison. A computing lane is referred to as an independent avionics control system having a computing system that communicates electronically with sensors on the aircraft, communicates with sensors which process the pilot's commands or actions, and also communicates with and controls the aircraft's actuators. Each flight control computer (FCC), having multiple computing lanes, is capable of controlling the aircraft in its entirety.

One reason that FBW systems use more than one computing lane is to meet different requirements for verification rigor, for example, to detect a computing lane electronic failure by comparing one computing lane with another computing lane of dissimilar design. Various electronic systems used in airborne environments may be subject to different requirements for verification rigor based on the criticality of the system. Criticality may be characterized by integrity and availability. Most modern aircraft are equipped with an automatic flight control system (AFCS) that can maintain the heading, altitude, and airspeed of the aircraft, couple with various guidance sources, and in many cases, perform automatic landings. In addition, the most sophisticated aircraft today include a flight management system (FMS) that can navigate the aircraft along a pilot entered route or one of a plurality of pre-programmed routes from an origination point to a predetermined destination and can deliver the aircraft to a point at which an automatic approach and landing sequence can be commenced, with minimal intervention required from the pilot once the FMS is programmed and activated. Each of these systems has an associated criticality and is generally subject to verification rigor based on such criticality.

Redundancy is commonly used to augment verification rigor. For example, several redundant elements (e.g., multiple computing lanes) may be used in a critical system, and these redundant elements typically cross-compare outputs to determine any errors in one of the redundant elements and by-pass the redundant element having such error. One concern is with the occurrence of a generic fault, particularly for a highly critical functionality, such as FBW where the system is full-time (e.g., from "wheels-up" until "wheels-down"), in which an error or loss of function has significant consequences. A generic fault refers to a fault fundamental to all of the redundant elements for a particular aspect of function in a system.

Dissimilar redundancy, such as using similar functioning components from different manufacturers, is one technique for designing systems to meet a desired criticality and mitigate generic faults in systems incorporating hardware devices that are "complex" as defined by DO-254. The functionalities associated with complex hardware devices, such as programmable logic devices (PLDs) and application specific integrated circuits (ASICs), add difficulty to the implementation of dissimilar redundancy and require specific architectural treatment in the design and/or application of dissimilar redundancy. Additionally, dissimilar redundancy may be difficult to implement for complex communications paths within the FBW electronic system thereby necessitating architectural treatment to limit the potential fault effects and mitigate what would otherwise be a full-time exposure to critical fault scenarios in complex devices.

Accordingly, it is desirable to provide an FBW system that mitigates generic fault effects either architecturally or through dissimilarity of complex components. In addition, it is desirable to provide a method for mitigating generic fault effects in airborne electronic systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for redundancy management in a control system. In an exemplary embodiment, a control module for producing a control signal is provided comprising a common processing partition having a first input configured to receive a flight input signal and a second input configured to receive at least one first mode input signal, a first processing partition coupled to the common processing partition and configured to receive the at least one first mode input signal and the flight input signal from the common processing partition, and a second processing partition coupled to the common processing partition. The first processing partition is configured to produce a first mode output signal in response to one of the at least one first mode input signal and the flight input signal. The second processing partition is configured to generate the second mode signal in response to the flight input signal when the first processing partition fails. The common processing partition is configured to produce the control signal in response to one of the first mode output signal and the second mode signal.

In another exemplary embodiment, a system for controlling an actuator is provided comprising an actuator control system configured to transmit a control signal to the actuator, and a flight control module (FCM) coupled to the actuator control system. The actuator control system comprises a common processing partition configured to receive a pilot input signal and at least one first mode input signal, a first processing partition coupled to the common processing partition and configured to produce the first mode output signal in response to one of the at least one first mode input signal, and a second processing partition coupled to the common processing partition and configured to generate the second mode signal in response to the flight input signal when the first processing partition fails. The common processing partition is configured to produce the control signal in response to one of a first mode output signal and a second mode signal. The FCM is configured to produce the at least one first mode input signal in response to the pilot input signal, receive the first mode output signal, and determine when the first processing partition fails based on the first mode output signal.

In another exemplary embodiment, a method for controlling actuators in a flight control system is provided. The flight control system has a normal mode partition, a direct mode partition, and a common partition. The method comprises the steps of operating the normal mode partition while partially isolating the direct-mode partition from the common partition, selecting the direct mode partition only when the normal mode partition fails, and producing an actuator control signal based on one of the normal mode partition and the direct mode partition.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is a control system and method for architectural mitigation of failures of a normal mode partition in the control system. In one exemplary embodiment, the control system comprises the normal mode partition, a direct mode partition, and a common partition that is preferably "simple" in compliance with DO-254. Both of the normal mode partition and the direct mode partition operate with portions of the common partition to produce output command signals. The control system is configured to receive computed command signals from an external source (e.g., one or more flight control modules (FCMs)) and generate output command signals in response to the received computed command signals, and these output command signals are supplied to any device that is desired to be controlled by the control system. In response to the received computed command signals, signals are generated by at least one of the normal mode and direct mode partitions. Under normal operating conditions, the normal mode partition is selected, and output commands are generated by the normal mode partition with the common partition in response to the received computed commands. In the event of a failure to the normal mode partition, the direct mode partition is selected, and output commands are generated by the direct mode partition with the common partition in response to the received computed commands. To detect failures in the normal mode partition, the received computed commands include an encoded data packet that enables detection of corrupted signals generated by the normal mode partition or other sources in the control system. For example, the signals produced by the normal mode partition are checked for the encoded data packets, and the absence of the encoded data packets indicates a corruption in the normal mode partition. Additionally, the signals generated by the normal mode partition are returned to the external source (e.g., via a wrap path) to compare these signal with the originally computed commands. When corruption is detected, the source of the computed commands (e.g., FCMs) may discontinue transmission of the computed commands to the normal mode partition and/or select the direct mode partition to produce the output commands thereby architecturally mitigating fault effects of the normal mode partition. Additionally, the direct mode partition may be full-time monitored using error detection encoding applied to any input signals received by the direct mode partition to compare the signals generated by the direct mode partition with the input signals and detect a possible corruption of the direct mode partition.

Figure 1:
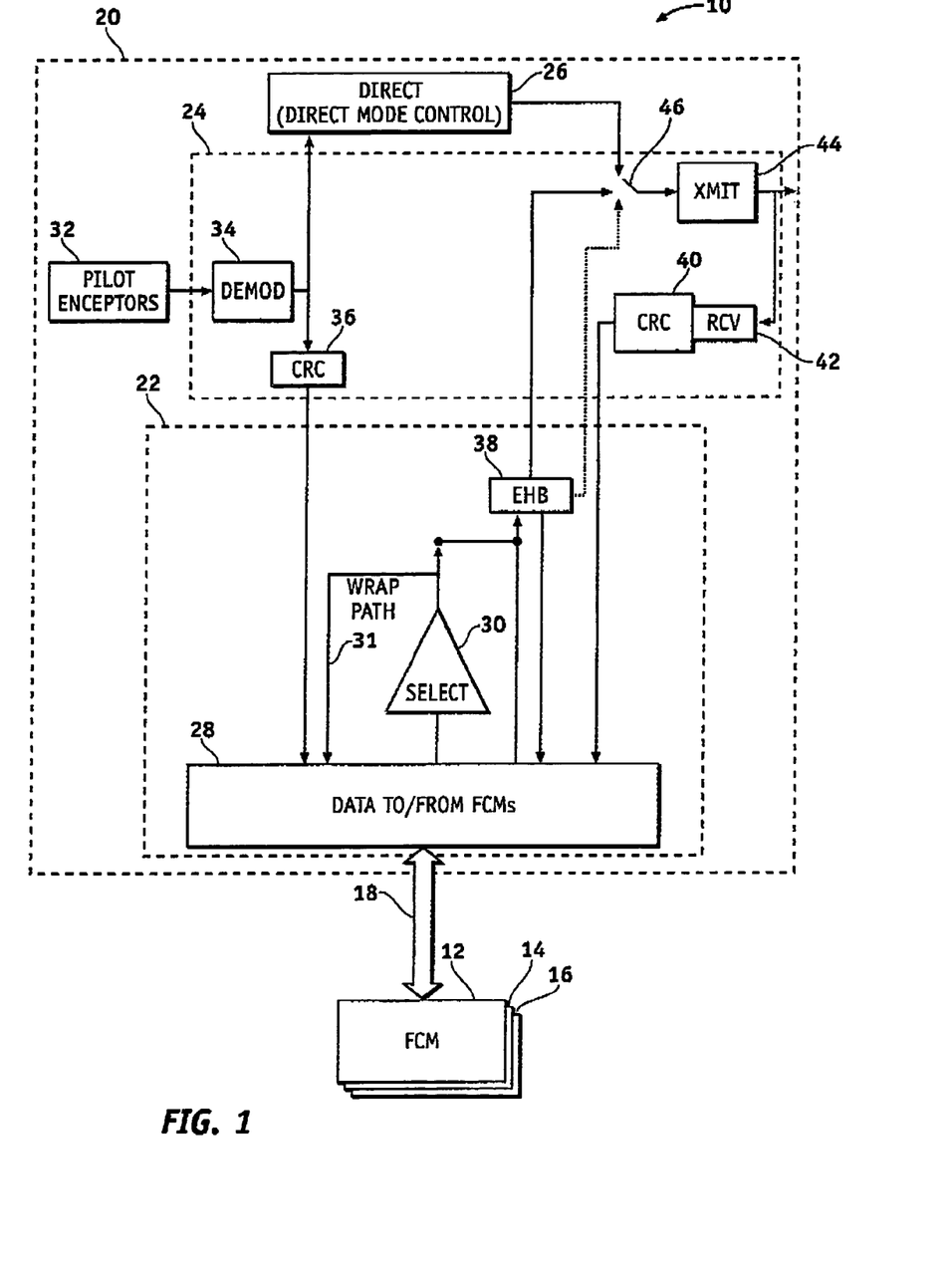
FIG. 1 is a block diagram of a fly-by-wire system in accordance with an exemplary embodiment of the present invention.

Referring now to the drawings, FIG. 1 is a block diagram of a fly-by-wire (FBW) system 10 in accordance with an exemplary embodiment of the present invention. Although the fault mitigating techniques of the present invention are described with respect to the FBW system 10, the fault mitigating techniques may be applied to any electronic control system particularly those control systems having highly critical functionality. The FBW system 10 comprises one or more flight control modules (FCMs) 12, 14, 16, a communication path 18, such as a bus, coupled to the flight control modules 12, 14, 16, and an actuator control system 20, or actuator control electronics (ACE), coupled to the communication bus 18. One or more functional aspects of the FBW system 10 may be implemented with or in one or more conventional digital signal processors (DSPs), conventional microprocessors, or with integrated circuits (ICs) such as Programmable Logic Devices (PLDs) or application-specific ICs (ASICs). In response to either a pilot input signal or a control signal produced by an FCM 12, 14, 16, the ACE 20 communicates with a corresponding actuator to provide movement to a primary control surface of an aircraft. Generally, actuators are controllable devices on an aircraft which are controlled by some other control device (e.g., a processor, a computer, a central processing unit, or the like) and which signal movement of certain attached structural portions of the aircraft, such as an aircraft surface. Such structures include airfoils, ailerons, elevators and like structures which move on the aircraft to operate the aircraft. These structures are commonly referred to as flight control surfaces. Although the operation of the FBW system 10 is described with respect to actuator control, other aircraft components may be controlled.

To control the actuators, the FBW system 10 is configured to operate in a normal mode and a direct mode. The normal mode refers to the control of the flight control surfaces of the airplane via the ACE 20 with various forms of augmentation performed by an FCM 12, 14, or 16. When the FCM is operating, the ACE 20 receives augmentation information from the FCM 12, 14, or 16, via the communication bus 18. The direct mode refers to when the pilot maintains control over the flight control surfaces in which the ACE 20 controls the flight control surface based on the pilot input signals or direct commands and without augmentation input from the FCMs 12, 14, 16. The direct mode of the ACE 20 provides a back-up, in effect, to the FCM augmented behavior of the ACE 20, for example, in the event of an FCM 12, 14, 16 failure. The FCM 12, 14, or 16 provides augmentation to the pilot's direct commands by introducing signals to the direct commands which smooth the flight of the airplane. The augmentation features of the FCM 12, 14, or 16 typically enhance aircraft handling characteristics and provide flight envelope protection.

The ACE 20 has at least one element that receives a plurality of aircraft operation data signals from other electrical components within the aircraft. For example, the aircraft operation data may include column position data, wheel data, pilot command data, column data, rudder pedal position data as well as interlock data. In this exemplary embodiment, the ACE 20 is coupled to the FCMs 12, 14, 16 and receives normal mode signals from the FCMs 12, 14, 16 via the communication bus 18. In this exemplary embodiment, the ACE 20 comprises a normal mode processing partition 22, a direct mode processing partition 26, and a common processing partition 24 coupled to the normal mode processing partition 22 and the direct mode processing partition 26. The normal mode processing partition 22 comprises processing portions of the ACE 20 that are utilized during normal mode operation, and the direct mode processing partition 26 comprises processing portions of the ACE 20 that are utilized during direct mode operation. Both the normal mode processing partition 22 and the direct mode processing partition 26 operate with components of the common processing partition 24 to produce the actuator control signal.

The common processing partition 24 is preferably simple (e.g., the common processing partition 24 is fully analyzable and testable) in compliance with DO-254 standards. The common processing partition 24 receives input signals indicating the normal mode from the FCMs 12, 14, 16 via the communication bus 18 and makes these input signals available to both of the normal mode and direct mode processing partitions 22 and 26. Additionally, the common processing partition 24 receives pilot input signals (e.g., from pilot inceptors or associated actuator sensors) and provides the pilot input signals to the normal mode and direct mode processing partitions 22 and 26. Typically, the normal mode processing partition 22 passes any pilot input signals received from the common processing partition 24 to the FCMs 12, 14, 16 without further signal processing. The common processing partition 24 transmits an actuator control signal in response to an output signal from either the normal mode processing partition 22 or the direct mode processing partition 26.

In an exemplary embodiment, the common processing partition 24 comprises a demodulator 34 configured to produce pilot command signals from pilot input signals, a first encoder 36 (e.g., cyclic redundancy check (CRC) encoding) having an input coupled to an output of the demodulator 34, a selector unit 46, a transmitter 44 having an input coupled to an output of the selector unit 46, a receiver 42 having an input coupled to an output of the transmitter 44, and a second encoder 40 coupled to an output of the receiver 42. The demodulator 34 has an input for receiving pilot input signals from pilot inceptors 32, and the pilot inceptors 32 convert the pilot inputs or commands into electrical signals (e.g, the pilot input signals) via sensors or transducers. For example, the pilot provides inputs through the use of such components as rudder pedals and a control stick, and these inputs are converted to electrical signals and transmitted by the pilot inceptors 32. De-modulation is accomplished using readily analyzable techniques. The demodulator 34 demodulates the pilot input signals to produce a signal for selecting a corresponding command (e.g., in the direct mode partition 26). The demodulator 34 provides the demodulated pilot input signals to the direct mode processing partition 26 output and to the encoder 36. Error detection encoding, using techniques such as CRCs, applied by the encoder 36 to the data produced by the demodulated pilot input signals facilitates FCM detection of errors introduced between the common partition 24 and the FCMs 12, 14, 16 by the normal mode partition 22 as well as from other sources. For example, if the normal mode partition 22 corrupts the pilot input signal data returned to the FCMs 12, 14, 16, these FCMs would detect this corruption and reject the corrupted data. In the event that this corruption occurs in all of the ACEs, as might happen as a result of a generic error, reversion to the direct mode operation (e.g., generating output signals with the direct mode processing partition 26 independent of the normal mode partition 24) occurs.

Additionally, the common processing partition 24 further comprises an encoded heartbeat detector 38 that receives a selected command signal from the command selector 30 and determines the presence of a predetermined encoded data packet (e.g., an encoded heartbeat signal) in the normal mode input signal from the FCMs. The presence of the encoded data packet indicates a valid normal mode input signal and thus a valid command signal. When the presence of the encoded data packet is detected, the signal detector 38 provides the command signal and a validation signal to the selector unit 46 indicating that the command signal is valid with respect to the encoded data packet. In an another exemplary embodiment, the encoded heartbeat detector 38 is incorporated into the normal mode processing partition 22, to detect the presence of the encoded data packet in the signals generated by the normal mode processing partition 22.

The selector unit 46 selects an output signal from the normal mode processing partition 22 during normal operation and selects an output signal from the direct mode processing partition 26 only when the normal mode processing partition 22 fails. In an exemplary embodiment, the selector unit 46 selects the output signal from the normal mode processing partition when the normal mode signal is valid and selects the command signal from the direct mode processing partition 26 when the normal mode signal is invalid indicating a failure of the normal mode processing partition 22. The transmitter 44 produces the actuator control signal based on the selected output signal (e.g., from either the normal mode processing partition 22 or the direct mode processing partition 26). The receiver 42 receives the actuator control signal in a feedback loop to monitor the validity of the actuator control signal, and the second error detector 40 verifies the transmitted actuator control signal, such as by cyclic redundancy check or other error detection methods. An output of the second error detector 40 is coupled to the data bus interface 28 for monitoring of the transmitted actuator control signal by the FCMs.

In this exemplary embodiment, the normal mode processing partition 22 receives the normal mode input signals (e.g., augmentation signals) from the FCMs 12, 14, 16 via a data bus interface 28 and includes, but is not necessarily limited to, the command selector 30 coupled to the data bus interface 28. From the normal mode input signals, the command selector 30 produces a command signal corresponding to the particular normal mode input signal. For example, when FCM 12 transmits a signal to decrease pitch when the aircraft is slowing down, the command selector 30 produces a command signal corresponding to decreasing pitch. Additionally, the normal mode partition 22 includes a wrap path 31 from an output of the command selector 30 to the data bus interface 28. The wrap path 31 provides a feedback loop to the FCMs 12, 14, 16 for monitoring the command signals produced by the command selector 30, such as by comparison with the corresponding normal mode input signal from the FCMs. For example, a match of the produced command signal with the corresponding normal mode input signal validates the command signal.

The aircraft thus has the benefits of the FCM augmentation to the pilot direct inputs or commands, yet the aircraft is not solely dependent on the FCMs 12, 14, 16. In the event of a failure of the FCMs 12, 14, 16, pilot input (e.g., from the pilot enceptors 32) is still translated into movements of the flight control surfaces by the ACE 20. In the event of a failure of the FCMs 12, 14, 16, the ACE 20 can provide control to the pilot of the flight control surfaces in the direct mode.

Figure 2:
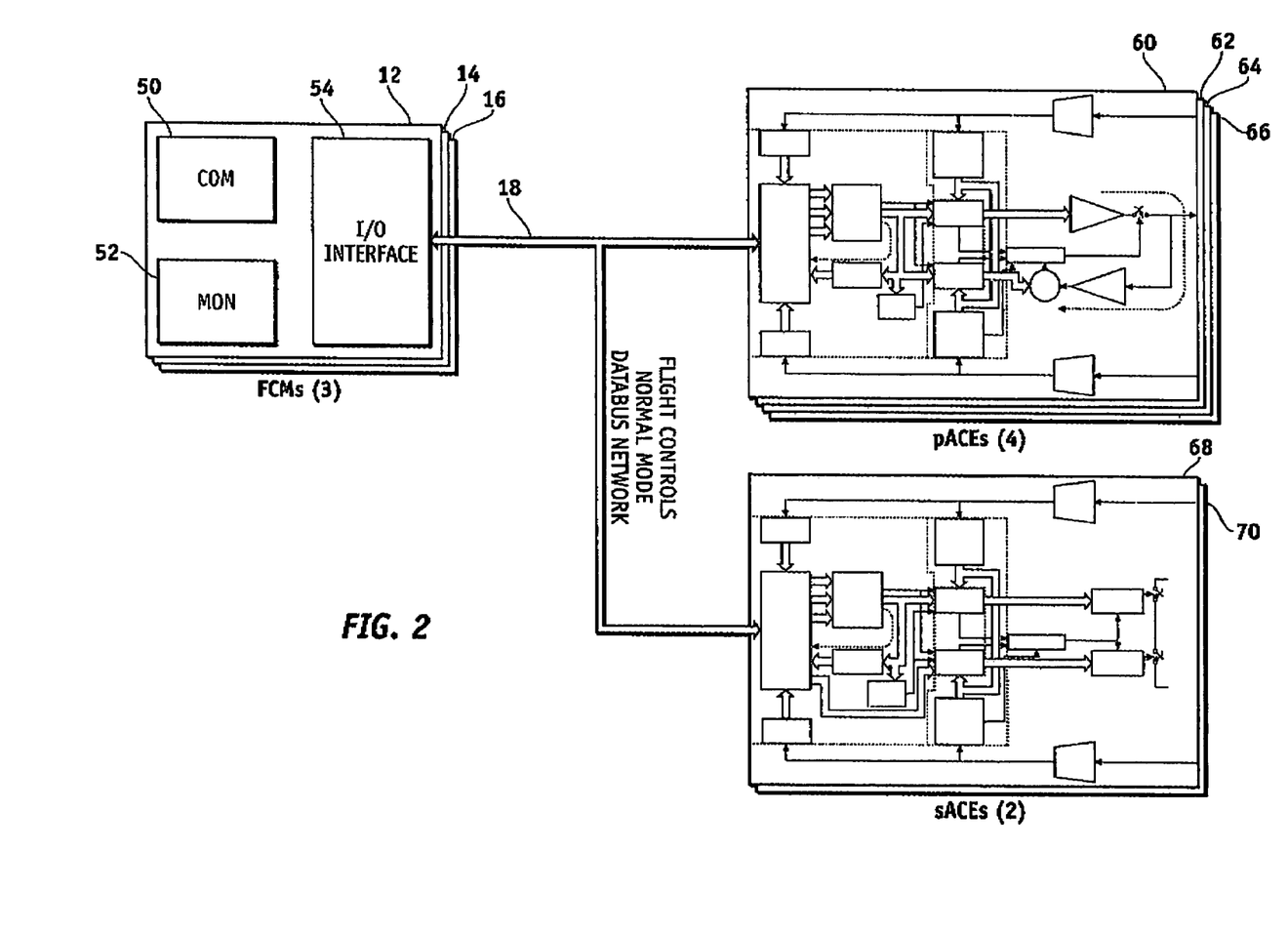
FIG. 2 is a block diagram of the fly-by-wire system shown in FIG. 1 showing flight control modules and actuator control electronics in accordance with an exemplary embodiment of the present invention.

FIG. 2 is a block diagram the FBW system 10 shown in FIG. 1 showing FCMs 12, 14, 16 and ACEs 60, 62, 64, 66, 68, 70 in accordance with an exemplary embodiment of the present invention. In this exemplary embodiment, the FCMs 12, 14, 16 communicate to primary ACEs 60, 62, 64, 66 and secondary ACEs 68, 70 via the communication bus 18. A typical commercial aircraft has two elevators, two ailerons, and one rudder for a total of five controllable flight control surfaces. At least one primary actuator is attached to each flight control surface, and each of the primary actuators is controlled by a primary ACE-60, 62, 64, 66. Additional secondary surfaces can be implemented into the FBW system 10, such as spoilers to control the speed break effect and also to assist in stopping the aircraft. These secondary surfaces are attached to secondary actuators and are controlled by secondary ACEs 68, 70.

Each of the FCMs 12, 14, and 16 and the ACEs 60, 62, 64, 66, 68, and 70 have dual processing lanes to provide redundancy for verification rigor. A first processing lane performs command operations, and a second processing lane performs monitoring operations of the first processing lane. For example, a primary FCM 12 has a command processing lane 50 and a monitoring processing lane 52 that communicates with the command processing lane 50. Both of the processing lanes 50 and 52 may receive normal mode input signals from the FCMs 12, 14, and 16 and may return output signals (e.g., verification signals of the normal mode input signals) to the FCMs 12, 14, and 16 via an input/output (I/O) interface that is coupled to the communication bus 18. The number of FCMs and ACEs may vary to control different actuators.

Figure 3:
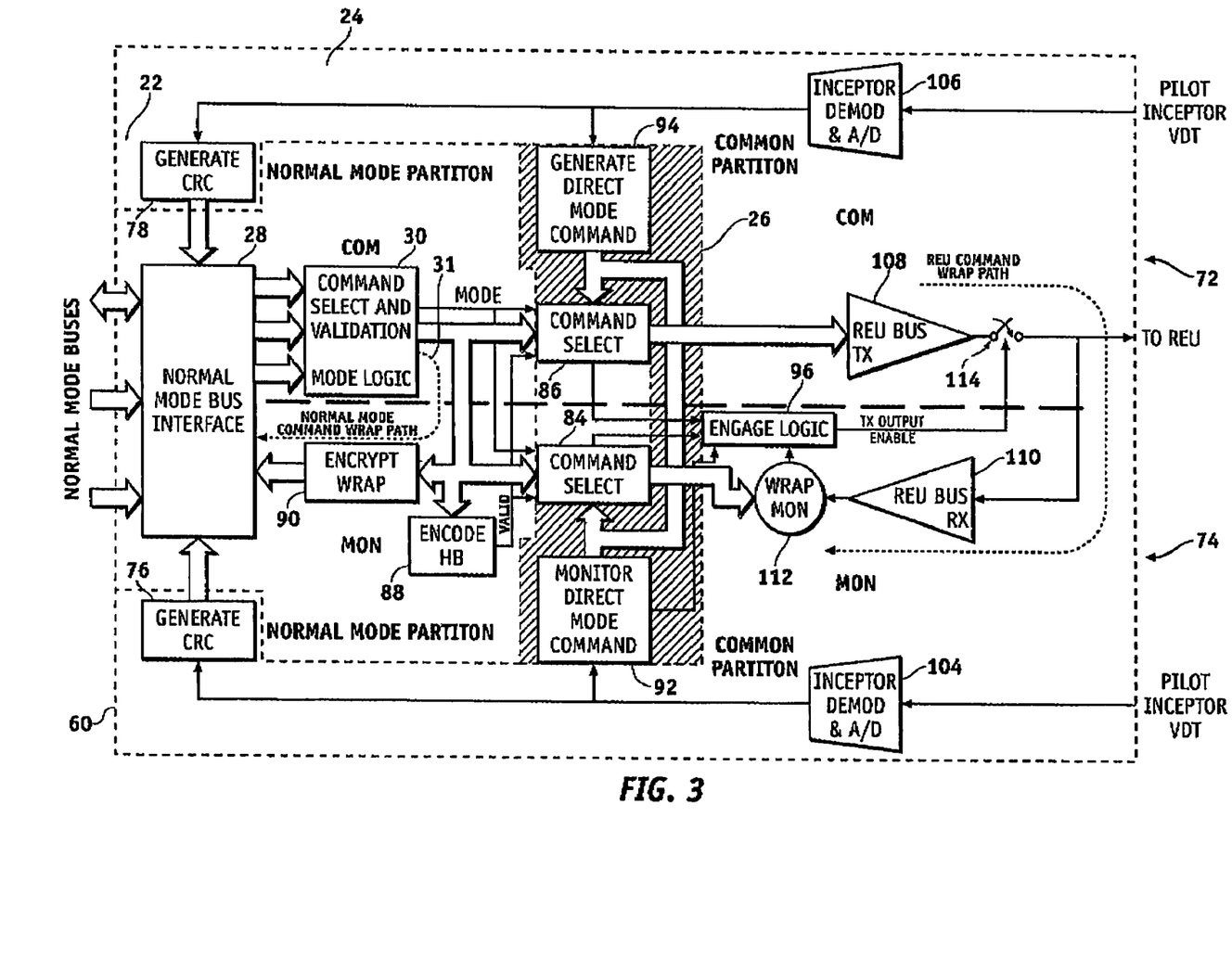
FIG. 3 is a block diagram of an actuator control system in accordance with an exemplary embodiment of the present invention.

FIG. 3 is a block diagram of the primary ACE 60 shown in FIG. 2. As previously mentioned, the ACEs 60, 68 each have dual processing lanes 72, 74. A command processing lane 72 is illustrated on the top half portion of the ACEs 60, 68, and a monitoring processing lane 74 is illustrated on the bottom half portion of the ACEs 60, 68. FIG. 3 illustrates the signal communication within and between the dual processing lanes 72, 74 of the ACEs 60, 68. The normal mode processing partition 22 comprises the data bus interface 28 having an input coupled to encoders 76 and 78, the command selector 30 having an input coupled to the data bus interface 28, an encoded heartbeat detector 88 having an input coupled to an output of the command selector 30, and an encryptor 90 having an input coupled to the output of the command selector 30 and having an output coupled to the data bus interface 28.

In this exemplary embodiment, the command selector 30 selects a command based on the normal mode input signal. The encoded heartbeat detector 88 produces a signal indicating whether the encoded data packet (e.g., the encoded heartbeat signal) is detected in the normal mode input signal. As previously mentioned, the presence of the encoded data packet is one indication of an uncorrupted normal mode input signal. The encryptor 90 encrypts the signal (e.g., the selected command) produced by the command selector 30 before returning the encrypted command signal to the data bus interface 28 to provide verification rigor (e.g., for verification by the FCMs). Thus, architectural mitigation of the normal mode processing partition is provided using the encoded heartbeat signal and the comparison of the selected command with the originated command via the wrap path 31.

The direct mode processing partition 26 comprises command processor units 92, 94 having cross-coupled outputs for redundancy verification. The command processor units 92, 94 generate direct mode signals in response to the demodulated pilot input signals received from the common processing partition 24. When the direct mode is selected (e.g., during failure of the normal mode partition 22), the common processing partition generates output commands based on the received direct mode signals.

The common processing partition 24 comprises the encoders 76 and 78 each having an input configured to receive demodulated pilot input signals and having an output coupled to the data bus interface 28, selector units 84, 86, a transmitter 108 having an input coupled to the output of a first selector unit 86 and having an output coupled to a switch 114, a receiver 110 having an input coupled to the switch 114, a wrap monitor 112, and demodulator and analog-to-digital (A/D) converter circuits 104, 106. The selector units 84, 86 each have a first input for receiving normal mode output signals (e.g., selected command signals) from the normal mode processing partition 22 and have a second input coupled to the outputs of the command processor units 92, 94 for receiving the direct mode signals from the direct mode processing partition 26. The selector units 84, 86 produce output command signals corresponding to the normal mode output signal from the normal mode processing partition 22 unless the normal mode partition has failed. For example, when the signal detector 88 does not detect the encoded data package in the normal mode input signal, the signal detector 88 produces a signal indicating a corrupt signal from the normal mode processing partition 22. When invalidity is indicated, the selector units 84, 86 select the direct mode signals from the command generator units 92, 94, respectively.

The transmitter 108 receives the output command signal from the selector unit 86, and both the transmitter 108 and receiver 110 are coupled to an actuation remote electronics unit (REU) bus to control a desired actuation REU (e.g., based on the output command signal). The wrap monitor 112 has a first input coupled to the second selector unit 84, a second input coupled to an output of the receiver 110, and an output coupled to a logic circuit 96. In this exemplary embodiment, the common processing partition 24 has a command wrap path to monitor the transmitted actuator control signals. The transmitter 108 receives the command signal from the selector unit 86 and produces an actuator control signal that is enabled for transmission by the logic circuit 96 (e.g., based on a comparison of the command signals from the selector units 84, 86). The receiver 110 samples the actuator control signal transmitted from the transmitter 108 and provides these sampled signals to the wrap monitor 112 to complete the command wrap path from the transmitter 108. The logic circuit 96 uses the command signal switch status from the selector units 84, 86, the direct mode signal from the command processor unit 92, and the valid status from the transmit wrap monitor 112 to enable, via the switch 114, the transmitter 108 to transmit the actuator control signal.

The demodulator and A/D converter circuits 104, 106 are coupled to the input of the encoders 76, 78, respectively, and to the input of the command processor units 92, 94, respectively. The demodulator and A/D converter circuits 80, 82 demodulate pilot input signals that are provided to the normal mode and direct mode processing partitions 22 and 26 via the common processing partition 24.

Figure 4:
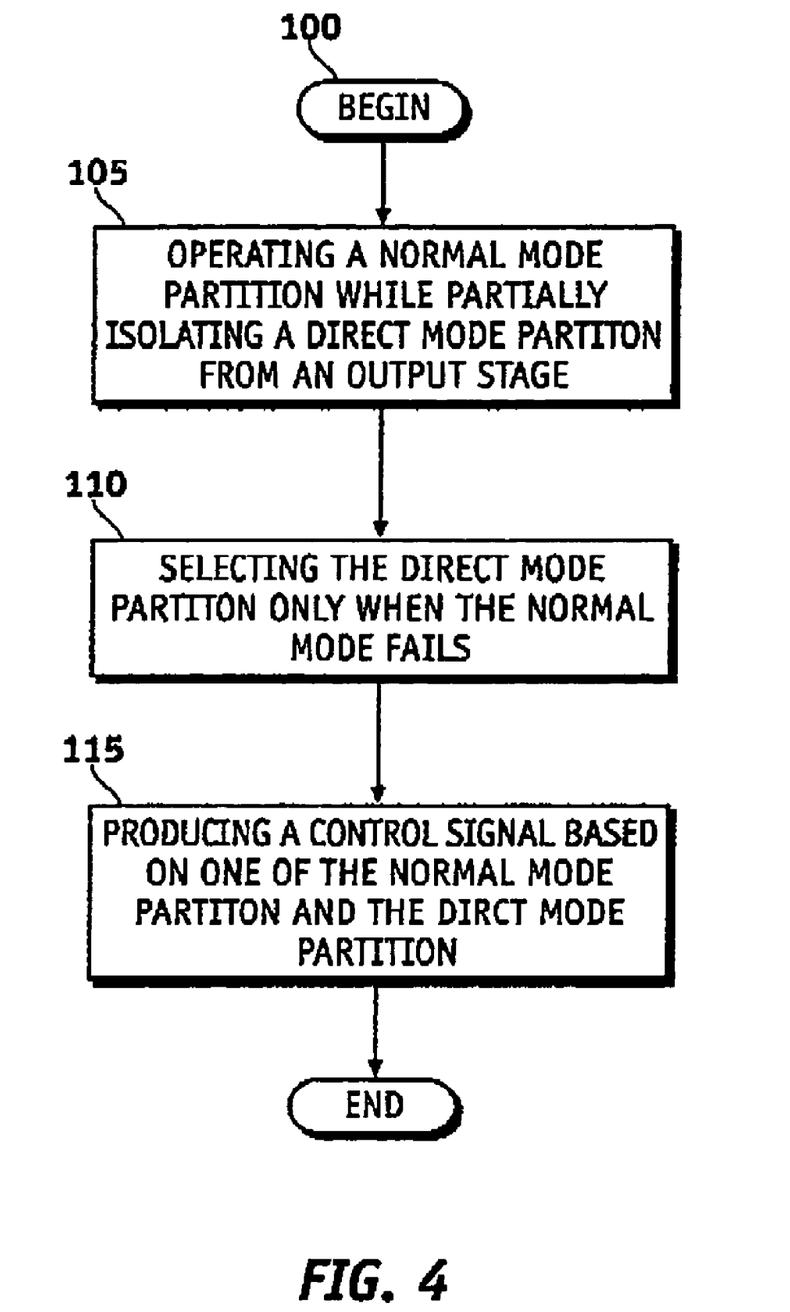
FIG. 4 is a flow diagram of a method for controlling an actuator with a flight control system in accordance with an exemplary embodiment of the present invention.

FIG. 4 is a flow diagram of a method 100 for controlling an actuator with a flight control system in accordance with an exemplary embodiment of the present invention. The flight control system includes, but is not necessarily limited to, a normal mode partition, a direct mode partition, and a common partition. The common partition is preferably simple in compliance with DO-254. A normal mode partition of the control system is operated while partially isolating the direct mode partition from the common partition at step 105. D u r in g normal mode operation, at least one normal mode input signal, indicating a command, is received from an FCM. A second command is selected (e.g., by the normal mode partition) based on the received normal mode input signal, and a verification signal, indicating the second command, is transmitted back to the FCM for monitoring the selected command (e.g., by comparing the selected command with the command indicated by the normal mode input signal). The verification signal may be encrypted. Additionally, the received normal mode input signal may include an encoded data packet (e.g., an EHB introduced into the normal mode input signal by the FCM). An intermediate signal is produced via the normal mode partition in response to the normal mode input signal. This intermediate signal may be derived from the received normal mode input signal or be the received normal mode input signal after having passed through the normal mode partition. The intermediate signal is monitored for the encoded data package to determine if the normal mode input signal was corrupted by the normal mode partition or from other sources. The direct mode partition is selected only when the normal mode partition fails at step 110. An actuator control signal is produced based on one of the normal mode partition and the direct mode partition at step 115. For example, during normal mode operation, the normal mode partition is selected and the common partition receives a signal from the normal mode partition. When the normal mode partition fails (e.g., as detected by the FCM based on a missing encoded data package in the intermediate signal or based on non-matching commands originated by the FCM and selected by the normal mode partition), the direct mode partition is selected and the common partition receives a signal from the direct mode partition. The actuator control signal is then generated from the signal received by the common partition from either the normal mode partition or the direct mode partition.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control system for producing a control signal, the control system, comprising:
   a common processing partition configured to receive a flight input signal and at least one first mode input signal, said common processing partition configured to produce the control signal in response to one of a first mode output signal and a second mode signal;
   a first processing partition coupled to said common processing partition and configured to receive said at least one first mode input signal and said flight input signal from said common processing partition and further configured to produce said first mode output signal in response to one of said at least one first mode input signal and said flight input signal; and
   a second processing partition coupled to said common processing partition and configured to generate said second mode signal in response to said flight input signal when said first processing partition fails.

2. A control system according to claim 1, wherein said common processing partition is simple based on a DO-254 standard.

3. A control system according to claim 1, wherein said second processing partition is further configured to be inactive until said first processing partition fails.

4. A control system according to claim 1 further comprising first and second processing lanes, each of said first and second processing lanes comprising a portion of each of said first processing partition, said second processing partition, and said common processing partition, said first processing lane configured to produce the control signal, said second processing lane configured to monitor said first processing lane.

5. A control system according to claim 1, wherein said first processing partition comprises:
   a bus interface configured to receive said first mode input signal; and
   a logic coupled to said bus interface and configured to select a command based on one of said at least one first mode input signal and further configured to validate said command.

6. A control system according to claim 1, wherein said at least one first mode input signal comprises an encoded data packet, said encoded data packet indicating a validity of said at least one first mode input signal, and wherein said first processing partition is further configured to:
   detect said encoded data packet in one of said at least one first mode input signal; and
   transmit a return signal indicating one of a presence of said encoded data packet in said one of said at least one first mode input signal and an absence of said encoded data packet in said one of said at least one first mode input signal, said absence indicating when said first processing partition fails.

7. A control system according to claim 1, wherein said first processing partition is further configured to:
   select a command based on one of said at least one first mode input signal; and transmit a return signal indicating said command to determine an invalidity of said one of said at least one first mode input signal, said invalidity indicating when said first processing partition fails.

8. A control system according to claim 1, wherein said common processing partition is further configured to:
   transmit an output signal based on said flight input signal; and
   confirm the control signal with said output signal.

9. A system for controlling an actuator, the system comprising:
   an actuator control system configured to transmit a control signal to the actuator, said actuator control system comprising:
      a common processing partition configured to receive a pilot input signal and at least one first mode input signal, said common processing partition configured to produce said control signal in response to one of a first mode output signal and a second mode signal;
      a first processing partition coupled to said common processing partition and configured to produce said first mode output signal in response to one of said at least one first mode input signal; and
      a second processing partition coupled to said common processing partition and configured to generate said second mode signal in response to said flight input signal when said first processing partition fails; and
   a flight control module (FCM) coupled to said actuator control system, said FCM configured to:
      produce said at least one first mode input signal in response to said pilot input signal;
      receive said first mode output signal; and
      determine when said first processing partition fails based on said first mode output signal.

10. A system according to claim 9, wherein said second processing partition is at least partially isolated from said communication path.

11. A system according to claim 9, wherein said actuator control system further comprises an output stage coupled to said common processing partition and configured to provide said actuator control signal to a predetermined actuator, and wherein said second processing partition is at least partially isolated from said output stage.

12. A system according to claim 9, wherein said common processing partition is simple based on a DO-254 standard.

13. A system according to claim 9, wherein said second processing partition is further configured to be inactive until said first processing partition fails.

14. A system according to claim 9, wherein said first mode output signal is a command, and wherein said first processing partition comprises:
   a wrap path configured to return an encrypted signal to said FCM via said communication path, said encrypted signal indicating said command.

15. A system according to claim 9, wherein said first processing partition comprises a monitor configured to detect an invalid encoded data packet in said at least one first mode input signal, said invalid encoded data packet indicating when said first processing partition fails.

16. A method for controlling an actuator with a flight control system having a normal mode partition, a direct mode partition, and a common partition, the method comprising the steps of:
   operating the normal mode partition while partially isolating the direct mode partition from the common partition;
   selecting the direct mode partition only when the normal mode partition fails; and
   producing an actuator control signal based on one of the normal mode partition and the direct mode partition.

17. A method according to claim 16, wherein said operating step comprises:
   receiving at least one normal mode input signal from a flight control module, the at least one normal mode input signal indicating a first command;
   selecting a second command based on the at least one normal mode input signal; and
   transmitting a verification signal indicating the second command to the flight control module.

18. A method according to claim 17, wherein said operating step further comprises encrypting the verification signal.

19. A method according to claim 16, wherein said operating step comprises:
   receiving at least one normal mode input signal from a flight control module, the at least one normal mode input signal having an encoded data package;
   producing an intermediate signal via the normal mode partition in response to the at least one normal mode input signal; and
   monitoring the intermediate signal for the encoded data package.

20. A method according to claim 16, wherein the common partition is simple based on a DO-254 standard, and wherein said producing step comprises:
   receiving an intermediate signal from one of the normal mode partition and the direct mode partition at the common partition; and
   generating the actuator control signal from the intermediate signal.

* * * * *